(12) United States Patent
Aota et al.

(10) Patent No.: US 7,796,224 B2
(45) Date of Patent: Sep. 14, 2010

(54) LIQUID CRYSTAL DISPLAY DEVICE

(75) Inventors: Masaaki Aota, Ogaki (JP); Yasuo Segawa, Kitagata-cho (JP); Tomohide Onogi, Anpachi-cho (JP)

(73) Assignee: Sony corporation, Tokyo (JP)

( * ) Notice: Subject to any disclaimer, the term of this patent is extended or adjusted under 35 U.S.C. 154(b) by 464 days.

(21) Appl. No.: 12/000,075

(22) Filed: Dec. 7, 2007

(65) Prior Publication Data

US 2008/0151167 A1 Jun. 26, 2008

(30) Foreign Application Priority Data

Dec. 26, 2006 (JP) ............................. 2006-349099
Dec. 26, 2006 (JP) ............................. 2006-349100

(51) Int. Cl.
*G02F 1/1343* (2006.01)

(52) U.S. Cl. ...................................... 349/139; 349/143

(58) Field of Classification Search ................. 349/139, 349/143
See application file for complete search history.

(56) References Cited

U.S. PATENT DOCUMENTS

| 5,870,160 | A | 2/1999 | Yanagawa et al. |
| 6,034,757 | A | 3/2000 | Yanagawa et al. |
| 6,108,066 | A | 8/2000 | Yanagawa et al. |
| 6,346,932 | B1 | 2/2002 | Maeda |
| 6,473,067 | B2 | 10/2002 | Maeda |
| 6,597,414 | B1 * | 7/2003 | Hasegawa .................... 349/40 |
| 6,657,608 | B2 | 12/2003 | Maeda |
| 7,453,089 | B2 * | 11/2008 | Yamazaki et al. ............. 257/72 |
| 2005/0190316 | A1 | 9/2005 | Takahashi et al. |
| 2006/0244893 | A1 | 11/2006 | Oda |
| 2008/0158453 | A1 * | 7/2008 | Segawa et al. ................ 349/34 |
| 2009/0279009 | A1 * | 11/2009 | Imai et al. .................... 349/40 |

FOREIGN PATENT DOCUMENTS

| CN | 1661449 A | 8/2005 |
| CN | 1854834 A | 11/2006 |
| JP | A-4-60512 | 2/1992 |
| JP | A-09-105918 | 4/1997 |
| JP | A-9-258203 | 10/1997 |
| JP | A-2004-4754 | 1/2004 |
| JP | 2009-53472 | * 3/2009 |

* cited by examiner

*Primary Examiner*—Dung T. Nguyen
(74) *Attorney, Agent, or Firm*—K&L Gates LLP

(57) ABSTRACT

A liquid crystal display device includes a first substrate, a second substrate, and liquid crystal. The first substrate includes pixel electrodes, at least one common electrode, and a circuit wiring. The second substrate is opposed to the first substrate and includes a translucent conductive film. The liquid crystal is held between the first substrate and the second substrate. The circuit wiring is arranged outside a pixel area in which a plurality of pixels, which are formed of the pixel electrodes and the at least one common electrode, are arranged. The translucent conductive film is arranged on an opposite side of the second substrate to a side where the liquid crystal is present, and the translucent conductive film is opposed to the pixel electrodes and the at least one common electrode. The translucent conductive film is maintained at a predetermined electric potential. The translucent conductive film has an outer periphery that is located closer to a center of the second substrate than an outer periphery of the second substrate.

8 Claims, 11 Drawing Sheets

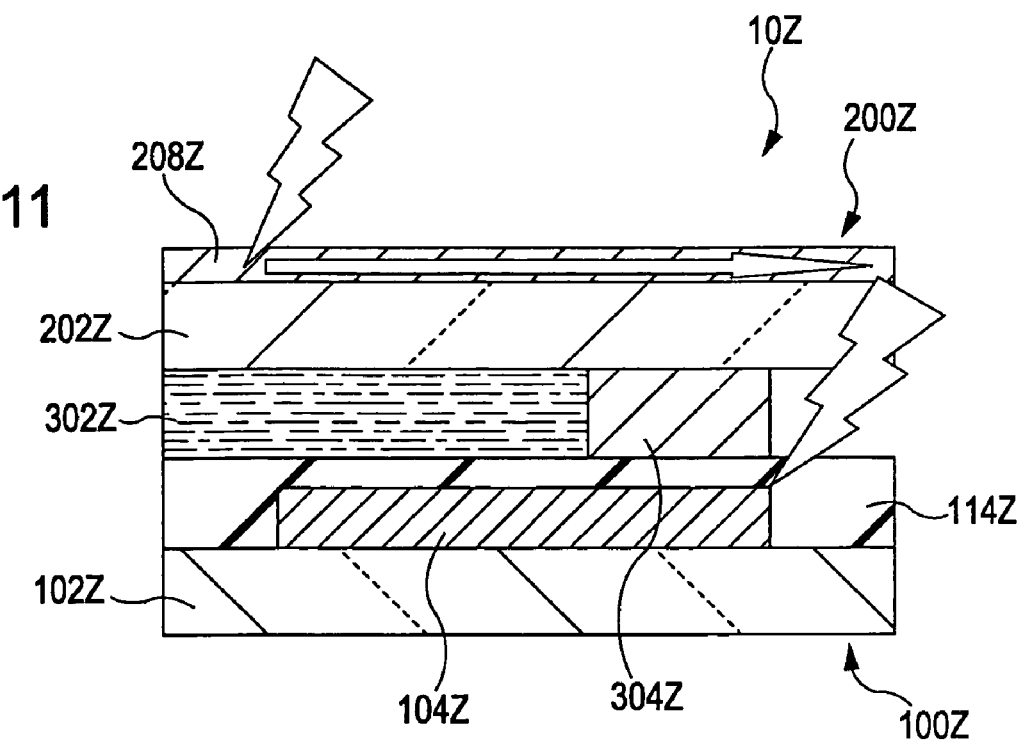
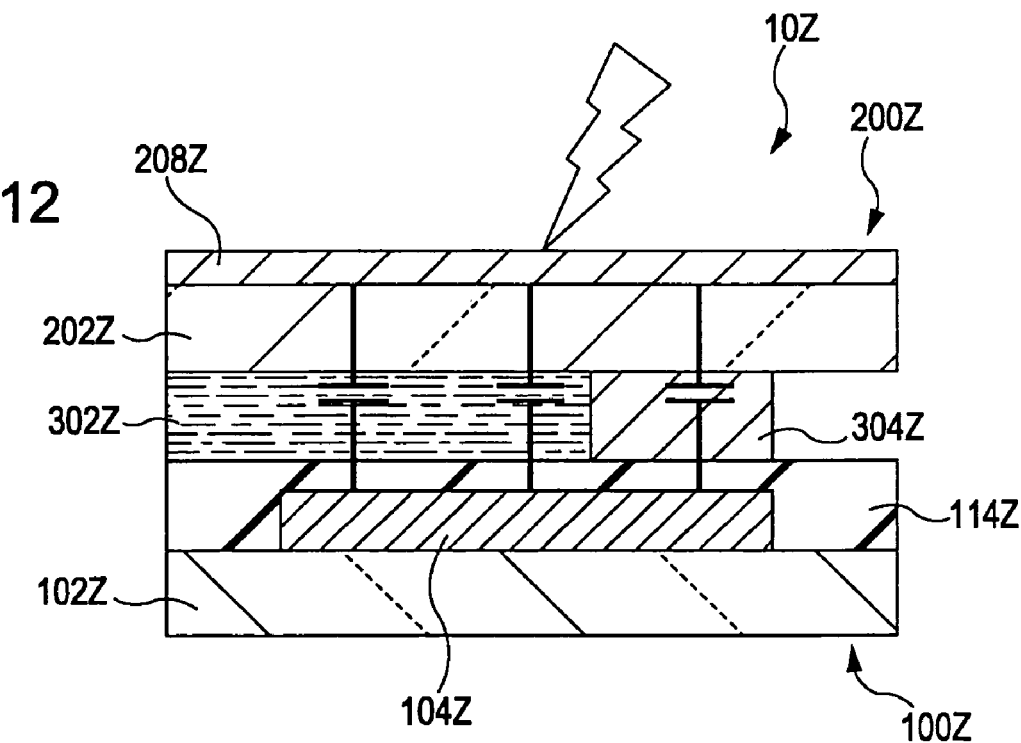

LIQUID CRYSTAL DISPLAY DEVICE

BACKGROUND

1. Technical Field

The present invention relates to liquid crystal display device and, more particularly, to a liquid crystal display device in which a pixel electrode and a common electrode that drive liquid crystal held between a first substrate and a second substrate, which are opposed to each other, are provided in the first substrate.

2. Related Art

In a FFS (Fringe Field Switching) mode liquid crystal panel, a pixel electrode and a common electrode, which control the alignment of liquid crystal, both are provided on an element substrate, and these two electrodes are laminated through an insulating film. Of these electrodes, an upper layer electrode is provided with slits. A rubbing process is treated in a direction that is substantially parallel to a long side direction of the slits. When the electric potential between the electrodes is an off potential, liquid crystal molecules are aligned in a direction that is substantially parallel to the long side direction of the slits. When an electric potential higher than the off potential is applied between the electrodes, an electric field (horizontal electric field) is generated in a direction perpendicular to the long sides of the slits, and liquid crystal molecules are rotated (horizontally rotated) in a plane parallel to the substrate along the direction of the electric field. By controlling the rotation angle of the liquid crystal molecules, the amount of light transmission is controlled.

Note that, in addition to the FFS mode, an IPS (In-Plane Switching) mode is known as a configuration in which both the pixel electrode and the common electrode are provided in the element substrate.

Liquid crystal panels have been progressively reduced in size, thickness, and window frame width, and progressively added with functions, such as a touch panel. In accordance with the above, static electricity from the outside of the panel through a human body, or the like, may cause a trouble in the panel.

For example, in the FFS mode, and the like, when an opposite substrate, which is opposed to an element substrate, is applied with static electricity and is electrostatically charged, there is a possibility that a vertical electric field is generated by the electrostatic charge and, hence, an appropriate alignment control on the liquid crystal using the electrodes provided in the element substrate cannot be performed. In this case, for example, in a normally black liquid crystal panel, a black display becomes whitish and, as a result, the contrast is decreased. In addition, when a degree of whitish display is not uniform over the entire screen, display chrominance non-uniformity is observed.

As one of countermeasures to the above, there is a manner in which a translucent conductive film is formed over the entire outer surface of the opposite substrate, and this translucent conductive film is connected to a case or an FPC (Flexible Printed Circuit) terminal, thus releasing the electrostatic charge to the ground electric potential (GND) of an external circuit, which is described in Japanese Unexamined Patent Application Publication No. 9-105918.

Even with the above countermeasure, however, it has been found that there is a possibility that a sufficient electrostatic discharge resistance cannot be obtained.

SUMMARY

An advantage of some aspects of the invention is that it provides a liquid crystal display device, in which a pixel electrode and a common electrode that drive liquid crystal held between a first substrate and a second substrate, opposed to each other, are provided in the first substrate, that improves electrostatic discharge resistance.

A first aspect of the invention provides liquid crystal display device. The liquid crystal display device includes a first substrate, a second substrate, and liquid crystal. The first substrate includes pixel electrodes, at least one common electrode, and a circuit wiring. The second substrate is opposed to the first substrate and includes a translucent conductive film. The liquid crystal is held between the first substrate and the second substrate. The circuit wiring is arranged outside a pixel area in which a plurality of pixels, which are formed of the pixel electrodes and the at least one common electrode, are arranged. The translucent conductive film is arranged on an opposite side of the second substrate to a side where the liquid crystal is present, and the translucent conductive film is opposed to the pixel electrodes and the at least one common electrode. The translucent conductive film is maintained at a predetermined electric potential. The translucent conductive film has an outer periphery that is located closer to a center of the second substrate than an outer periphery of the second substrate.

Here, the outer periphery of the translucent conductive film may be located closer to the center of the second substrate than the circuit wiring. In addition, the circuit wiring may extend along an outer periphery of the first substrate. Furthermore, the first substrate may further include a predetermined electric potential applying wiring to which the predetermined electric potential is applied, wherein the translucent conductive film has a pull-out portion that extends toward the predetermined electric potential applying wiring, and wherein the translucent conductive film is connected through the pull-out portion to the predetermined electric potential applying wiring.

A second aspect of the invention provides liquid crystal display device. The A liquid crystal display device includes a first substrate, a second substrate, and liquid crystal. The first substrate includes pixel electrodes, at least one common electrode, and a circuit wiring. The second substrate is opposed to the first substrate, and includes a translucent conductive film and an insulating film. The liquid crystal is held between the first substrate and the second substrate. The circuit wiring is arranged outside a pixel area in which a plurality of pixels, which are formed of the pixel electrodes and the at least one common electrode, are arranged. The translucent conductive film is arranged on an opposite side of the second substrate to a side where the liquid crystal is present, and the translucent conductive film is opposed to the pixel electrodes and the at least one common electrode. The translucent conductive film is maintained at a predetermined electric potential. The insulating film is arranged on the translucent conductive film. The insulating film covers an outer periphery of the translucent conductive film.

Here, the outer periphery of the translucent conductive film may be located closer to a center of the second substrate than the circuit wiring. In addition, the circuit wiring may extend along an outer periphery of the first substrate. Furthermore, the insulating film may be an optical film.

BRIEF DESCRIPTION OF THE DRAWINGS

The invention will be described with reference to the accompanying drawings, wherein like numbers reference like elements.

FIG. 11 is a cross-sectional view that illustrates an influence of static electricity according to an existing FFS mode liquid crystal display device.

FIG. 12 is a cross-sectional view that illustrates an influence of static electricity according to an existing FFS mode liquid crystal display device.

DESCRIPTION OF EXEMPLARY EMBODIMENTS

Figure 1:
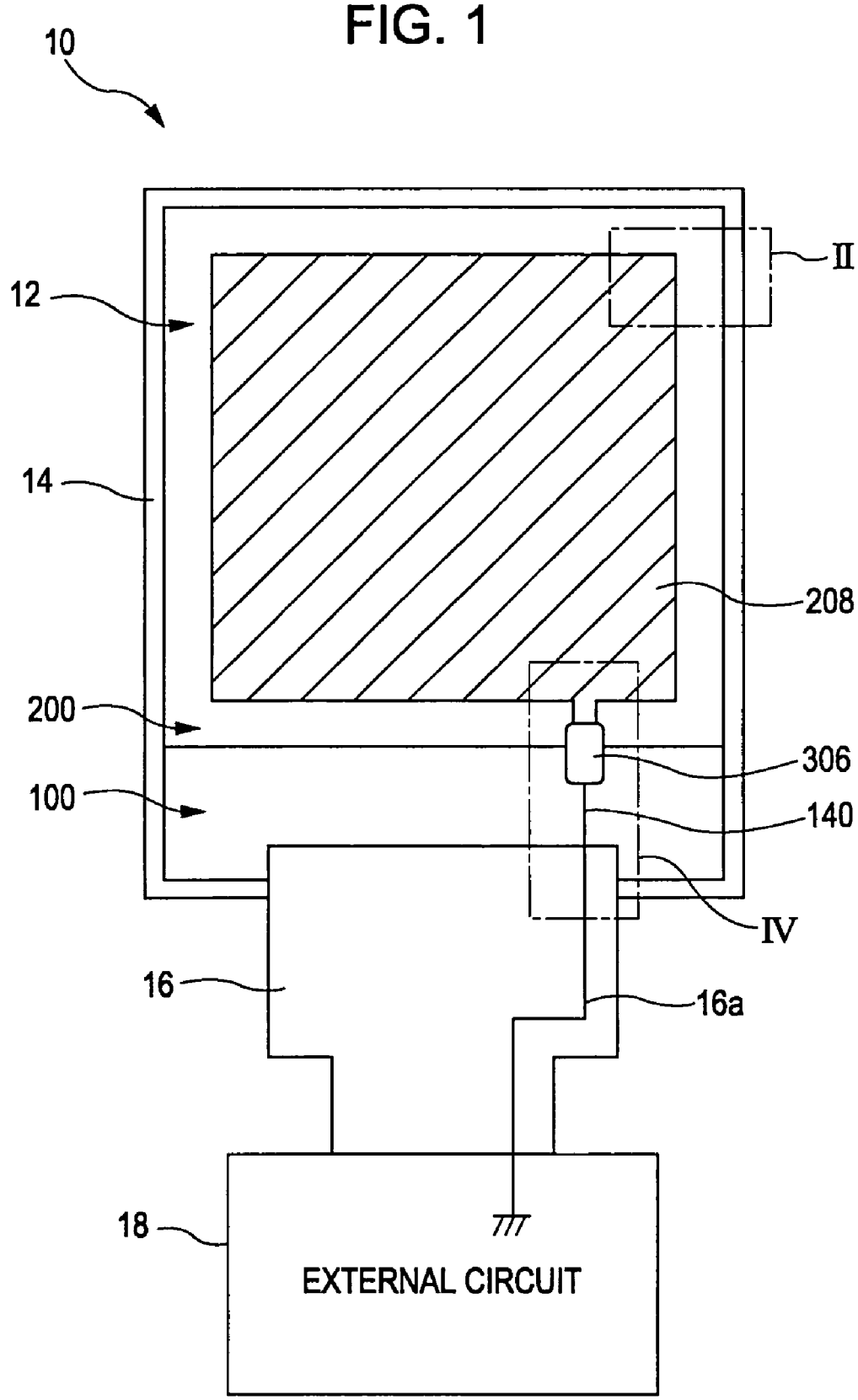
FIG. 1 is a schematic view of a liquid crystal display device according to an embodiment of the invention.

Before describing embodiments according to the invention, electrostatic discharge resistance has been considered on the basis of various evaluations. This will be described with reference to FIG. 11 and FIG. 12, illustrating the cross-sectional views around peripheral portions of a liquid crystal display device.

As shown in FIG. 11 and FIG. 12, in an existing FFS mode liquid crystal display device 10Z, a first substrate 100Z and a second substrate 200Z are adhered to each other by a seal 304Z, and liquid crystal 302Z is held between these substrates 100Z, 200Z. A circuit wiring group 104Z is arranged on a support substrate 102Z of the first substrate 100Z, and an insulating film 114Z is arranged so as to cover the circuit wiring group 104Z. Note that the circuit wiring group 104Z is schematically shown in the drawing. A translucent conductive film 208Z is arranged on an outer surface of a support substrate 202Z of the second substrate 200Z, and this translucent conductive film 208Z extends over the entire surface of the above outer surface, that is, to the outer periphery of the support substrate 202Z, that is, to the outer periphery of the second substrate 200Z. Note that, for example, by forming the translucent conductive film 208Z over the entire surface of a substrate, which includes multiple number of unit substrates, and then separating the substrate into the unit substrates, the translucent conductive film 208Z is formed so as to extend to the outer periphery of the second substrate 200Z.

When aerial discharge has been performed on the translucent conductive film 208Z, aerial discharge that is generated at the outer peripheral portion of the translucent conductive film 208Z, as shown in FIG. 11, was observed, and breakage was found in the circuit wiring group 104Z and elements connected thereto. According to the above, it is conceivable that static electricity is transmitted from the outer peripheral portion of the translucent conductive film 208Z over the side of the outer peripheral portion of the second substrate 200Z to the circuit wiring group 104Z. In this case, of the circuit wiring group 104Z, static electricity tends to be transmitted to a circuit wiring closer to the outer periphery of the substrate.

In addition, breakage also found in a circuit wiring remote from the outer periphery of the substrate and elements connected thereto. It is conceivable that this breakage occurs because the electric potential of the translucent conductive film 208Z rises due to static electricity that has entered the translucent conductive film 208Z, and then the electric potential of the circuit wiring group 104Z rises due to coupling with the electric potential rise of the translucent conductive film 208Z. That is, it is conceivable that the breakage occurs due to the transmission of static electricity on the basis of coupling (see FIG. 12). Note that FIG. 12 is a schematic view illustrating a state of coupling using the graphic symbols of capacitors. The coupling with the translucent conductive film 208Z tends to occur as the area of wiring pattern is increased, that is, the width and/or length, or the like, of the wiring is increased. It is conceivable that, for example, the coupling tends to occur with a power supply wiring that has a wide line width for reducing a resistance.

In addition, it has been found that breakage tends to occur more likely in the circuit wiring that extends along the outer periphery of the substrate than in the circuit wiring that extends in a direction which intersects the outer periphery of the substrate.

Figure 2:
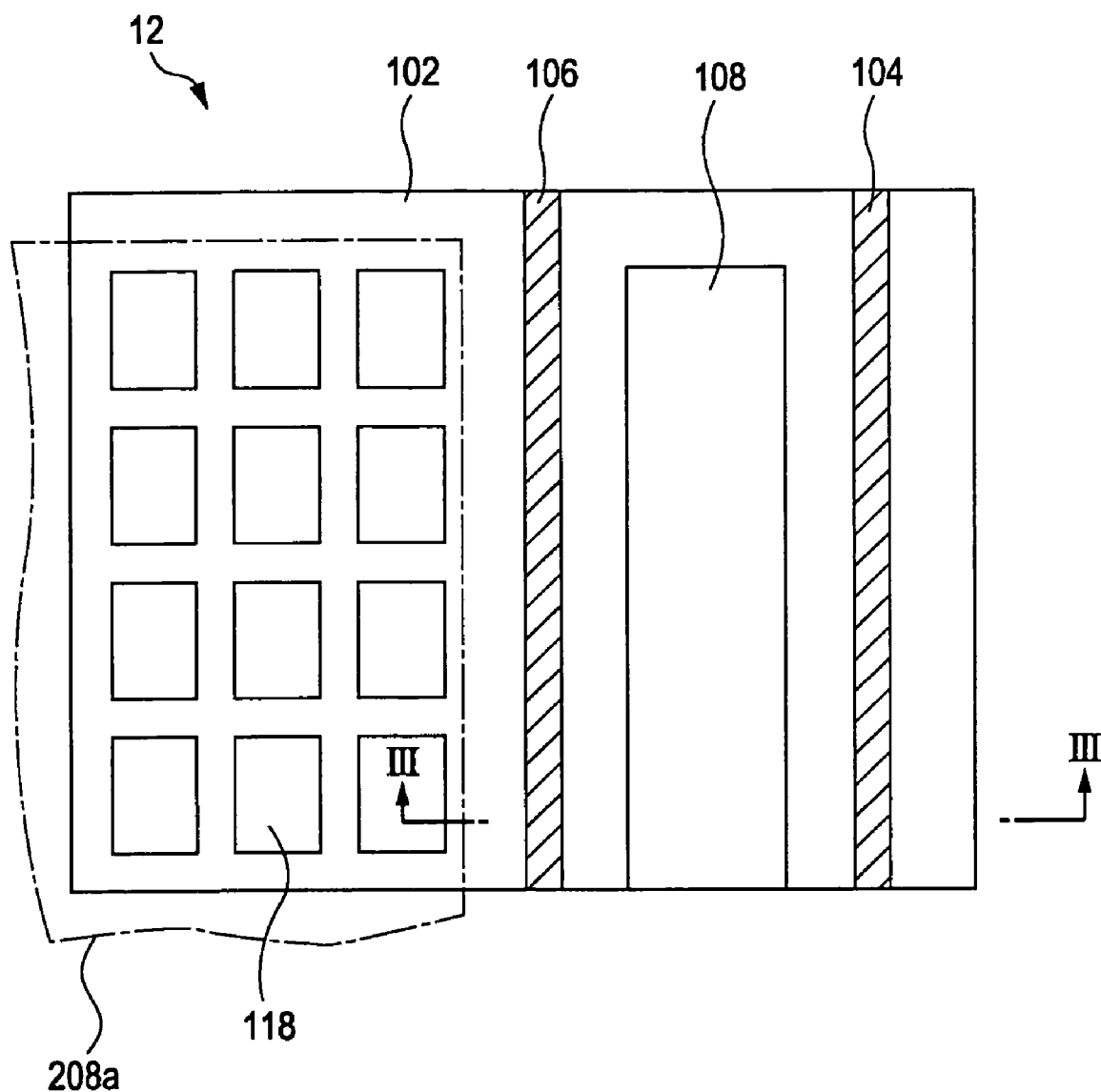
FIG. 2 is a plan view of a portion II, which is surrounded by alternate short and long dash line in FIG. 1.
Figure 3:
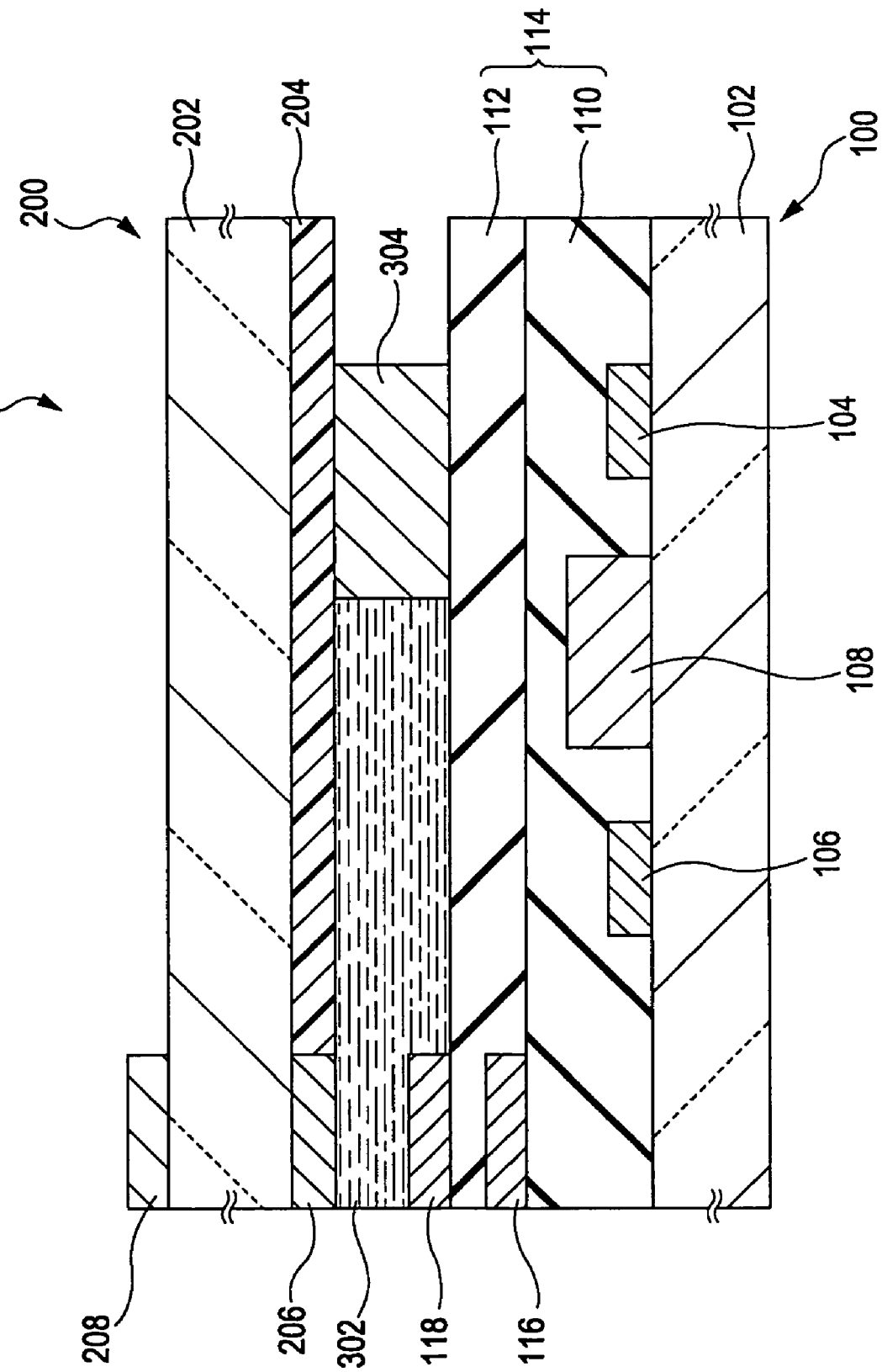
FIG. 3 is a cross-sectional view that is taken along the line III-III in FIG. 2.
Figure 4:
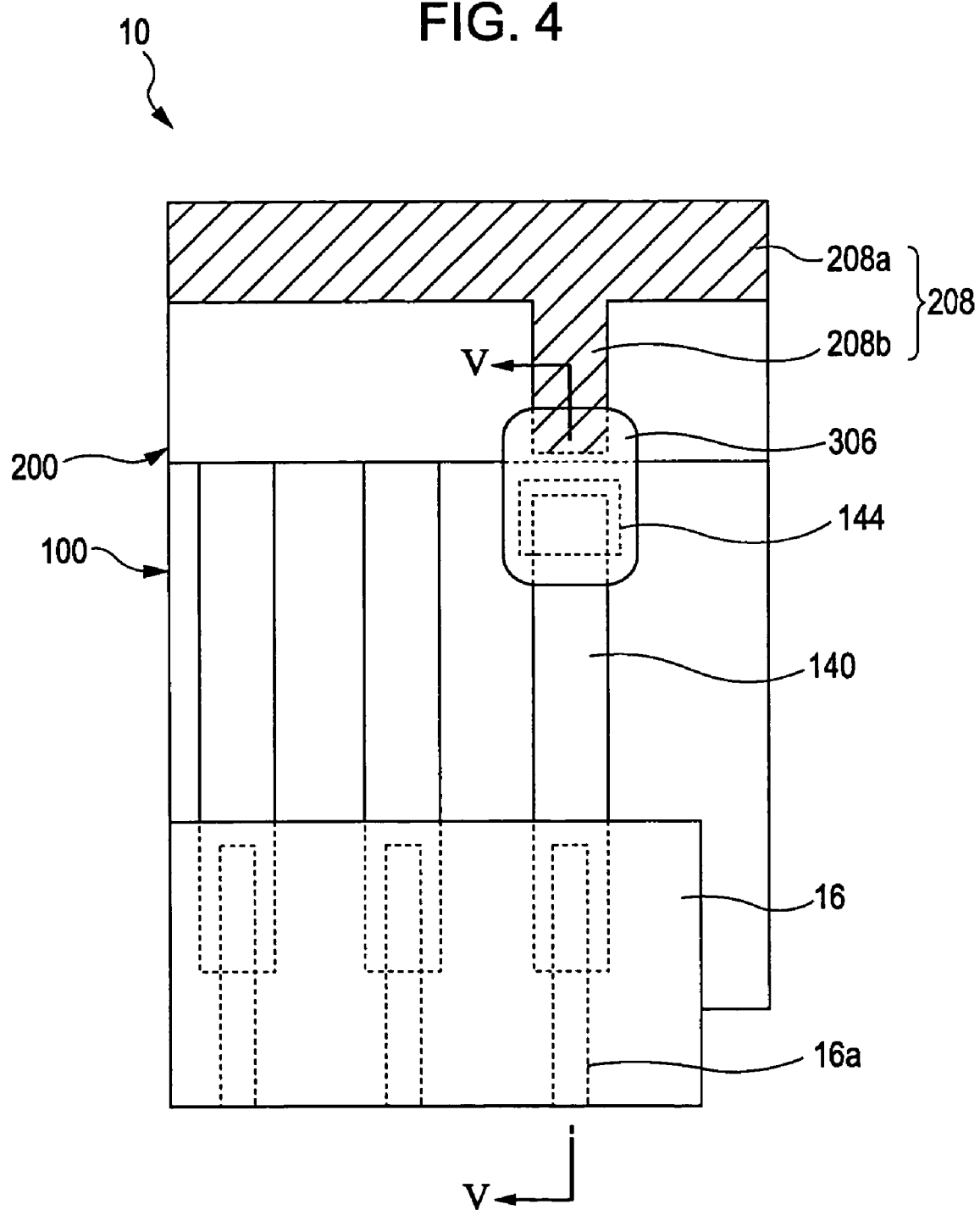
FIG. 4 is a plan view of a portion IV, which is surrounded by alternate short and long dash line in FIG. 1.
Figure 5:
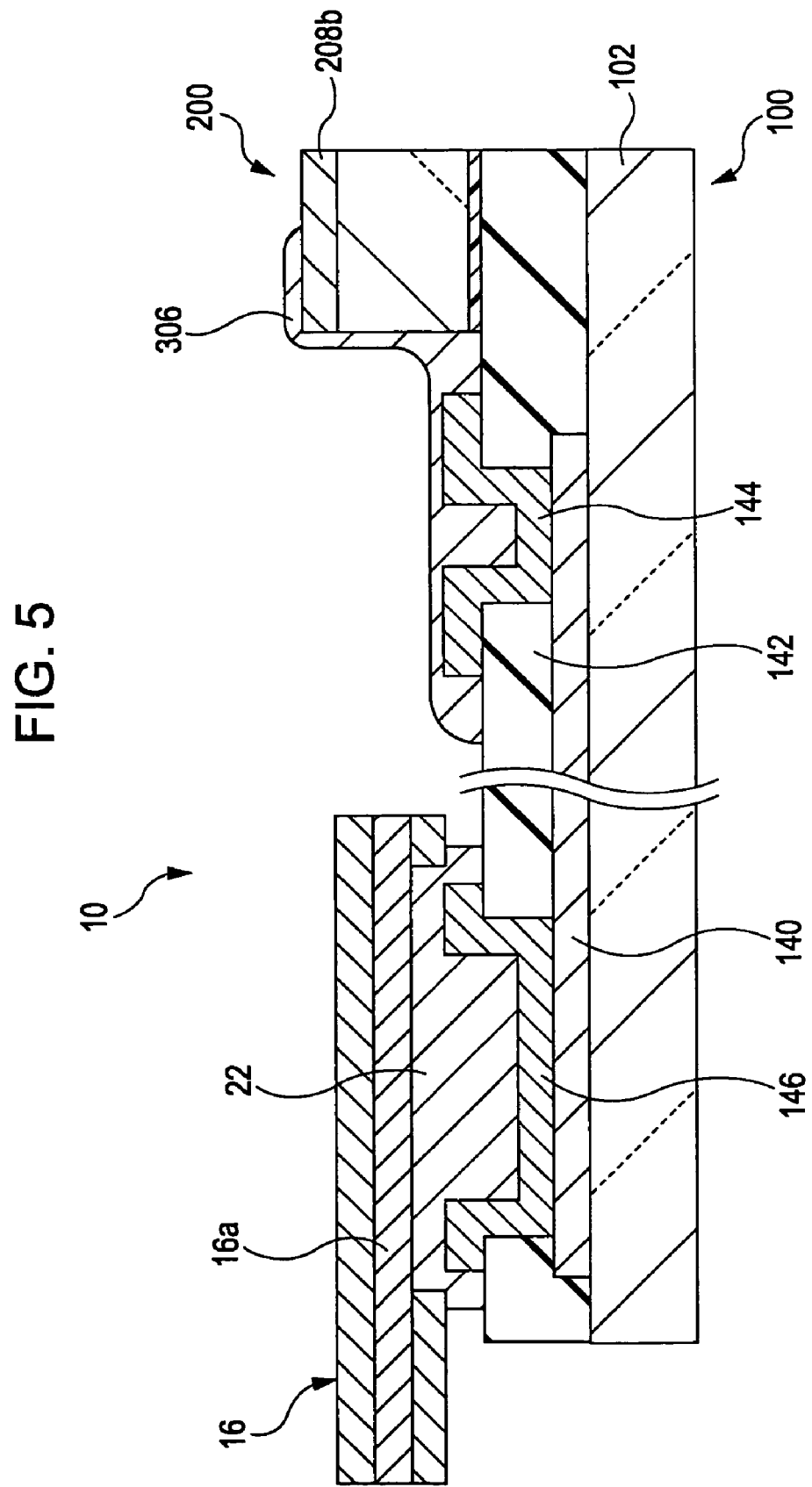
FIG. 5 is a cross-sectional view that is taken along the line V-V in FIG. 4.

A first embodiment according to the invention will now be described with reference to the accompanying drawings. FIG. 1 is a schematic view of a liquid crystal display device 10 according to the embodiment. In addition, FIG. 2 is a plan view of a portion II, which is surrounded by alternate short and long dash line in FIG. 1. FIG. 3 is a cross-sectional view that is taken along the line III-III in FIG. 2. FIG. 4 is a plan view of a portion IV, which is surrounded by alternate short and long dash line in FIG. 1. FIG. 5 is a cross-sectional view that is taken along the line V-V in FIG. 4. Note that, for easily understanding the drawings, components that are shown in each drawing and also shown in the other drawings are partially omitted, and portions of components are hatched in each of the plan views.

As shown in FIG. 1, the liquid crystal display device 10 is configured to include a liquid crystal panel 12, a case 14 for the liquid crystal panel 12, an FPC 16, and an external circuit 18. The liquid crystal panel 12 is connected to the external circuit 18 through the FPC 16. In place of the FPC 16, various wiring bodies may be used. The following will exemplify a case where the liquid crystal panel 12 uses an FFS mode. Note that the liquid crystal panel 12 may be any one of a transmissive type liquid crystal panel, a reflective type liquid crystal panel and a transflective type liquid crystal panel.

The liquid crystal panel 12 is configured to include a first substrate 100, a second substrate 200, liquid crystal 302 and a seal 304. The substrates 100, 200 are opposed to each other with a predetermined gap formed therebetween, and are adhered to each other at the peripheral portions by the seal 304. The liquid crystal 302 is held in a casing that is formed of the substrates 100, 200 and the seal 304.

The first substrate 100 includes a support substrate 102 that is, for example, formed of a translucent substrate, such as glass, and is configured to include, on the inner surface side of the support substrate 102, that is, on the side adjacent to the liquid crystal 302, circuit wirings 104, 106, a peripheral circuit 108, insulating films 110, 112, at least one common electrode 116, and pixel electrodes 118.

The common electrode 116 and the pixel electrodes 118 are paired electrodes that control the alignment of the liquid crystal 302, that is, that drive the liquid crystal 302. The common electrode 116 is commonly provided for a plurality of pixels, and each of the pixel electrodes 118 is provided for each of the pixels. An electric potential corresponding to a display of each pixel is supplied to the corresponding pixel electrode 118. Note that it may also be configured that the common electrode 116 is provided for each of the pixels and then a common electric potential is supplied to the common electrode 116. That is, the plurality of pixels are formed of the plurality of pixel electrodes 118 and the at least one common electrode 116. In the FFS mode liquid crystal panel 12, the electrodes 116, 118 both are provided in the first substrate 100, and the electrodes 116, 118 are laminated through the insulating film 112. The following will exemplify a case where the pixel electrodes 118 are arranged in an upper side layer, that is, on the side adjacent to the liquid crystal 302; however, the common electrode 116 may be arranged in the upper side layer. Slits (not shown) are formed in each of the upper layer pixel electrodes 118, and the alignment of the liquid crystal 302 is controlled by an electric field generated between the electrodes 116, 118 through the slits. The electrodes 116, 118 are, for example, formed of a translucent conductive film, such as ITO (Indium Tin Oxide).

FIG. 2 exemplifies a case where the pixel electrodes 118 are arranged in a matrix, that is, the pixels are arranged in a matrix. However, the pixels may be, for example, arranged in a delta. Note that the outermost pixels that are arranged all around, or more number of pixels in addition to the outermost pixels, may possibly be used as dummy pixels that do not directly contribute to image display.

The circuit wirings 104, 106 and the peripheral circuit 108 are arranged outside a pixel area. Here, the pixel area is an area in which a plurality of the pixels are arranged. In other words, the plurality of pixels are arranged in the pixel area. Note that an area for the dummy pixels also included in the pixel area. The circuit wirings 104, 106 are wirings that constitute driving circuits, or the like, provided in the liquid crystal panel 12, which are, for example, various wirings for power supply. The circuit wirings 104, 106 are wirings that extend along the outer periphery of the first substrate 100 and, specifically, that extend along one side of the outer periphery or a plurality of sides of the outer periphery. The circuit wirings 104, 106 each have a length that is, for example, greater than the width of an area outside the pixel area. The peripheral circuit 108 is schematically shown in the drawing and, for example, includes a driver circuit, and the like, that supplies an electric potential to the pixel electrodes 118. Note that the detailed connection between the peripheral circuit 108 and the circuit wirings 104, 106 and the detailed connection between the peripheral circuit 108 and the electrodes 116, 118 may use general various configurations, and a description of the detailed connection is omitted.

In the drawing, it exemplifies that the circuit wiring 104 is located closer to the outer peripheral side of the first substrate 100 than the circuit wiring 106, and the peripheral circuit 108 is arranged between the circuit wirings 104, 106. However, the arrangement is not limited to this. For example, even within the first substrate 100, there may be a portion where one or plurality of the above elements 104, 106, 108 are not present depending on a position thereof. In addition, two of the circuit wirings 104, 106 are exemplified, but the number of circuit wirings is not limited to this. One or both of the circuit wirings 104, 106 may be multiple.

The insulating films 110, 112 are, for example, formed of silicon oxide, silicon nitride, or the like, and are laminated on the support substrate 102. Note that, for easy description, it exemplifies a case where the insulating film 110 is located in a layer lower than the common electrodes 116, that is, the layer adjacent to the support substrate 102, and the insulating film 112 is laminated on the insulating film 110. However, these insulating films 110, 112 are collectively called as an insulating film 114. The insulating films 110, 112 each may be a monolayer film or may be a multilayer film.

Note that FIG. 3 exemplifies a case where the circuit wirings 104, 106 and the peripheral circuit 108 are in contact with the support substrate 102 and are covered with the insulating film 110. However, it may be configured so that one or plurality of these elements 104, 106, 108 are embedded in the insulating film 114 formed of a multilayer film and are not in contact with the support substrate 102.

The second substrate 200 includes a support substrate 202 that is, for example, formed of a translucent substrate, such as glass, and is configured to include, on the inner surface side of the support substrate 202, that is, on the side adjacent to the liquid crystal 302, a light shielding film 204, a color filter 206 and to include, on the outer surface side of the support substrate 202, that is, on the side opposite to the liquid crystal 302, a translucent conductive film 208. Note that FIG. 2 is a view that shows the translucent conductive film 208 by alternate short and long dash line.

The support substrate 202 is opposed to the first substrate 100, and has a size to be opposed to the electrodes 116, 118, the circuit wirings 104, 106 and the peripheral circuit 108. The light shielding film 204 extends over the entire surface on the support substrate 202 and has an opening at a position opposite each of the pixel electrodes 118. Note that no opening is provided at a position opposite each of the dummy pixels. The light shielding film 204 is, for example, formed of a resin, or the like, containing black pigment. The color filter 206 is arranged on the support substrate 202 and is provided in each opening portion of the light shielding film 204 so as to be opposed to the corresponding electrodes 116, 118.

The translucent conductive film 208 is arranged on the outer surface of the support substrate 202 and is opposed to the electrodes 116, 118, and the like, through the substrate 202. The translucent conductive film 208 is maintained at an arbitrarily predetermined electric potential, for example, a ground electric potential, and releases static electricity, which enters from the outside of the panel toward the second substrate 200, thus preventing electrostatic charge of the second substrate 200. That is, the translucent conductive film 208 serves as a shielding film. Thus, it is possible to suppress a trouble due to electrostatic charge of the second substrate 200, that is, for example, a decrease in contrast and chrominance non-uniformity.

The translucent conductive film 208 is, for example, formed of ITO, or the like, and may be formed of any one of an inorganic material or an organic material. The translucent conductive film 208 may be formed by a process, such as a sputtering process, a plasma CVD (Chemical Vapor Deposition) process, a spin coating process, and a printing process. The translucent conductive film 208 has a resistivity (sheet resistance) of, for example, 105Ω/□, which is preferably as low as possible. The translucent conductive film 208 is configured to include a body portion 208a and a pull-out portion 208b (see FIG. 4).

The body portion 208a of the translucent conductive film 208 is opposed to the common electrode 116 and the pixel electrodes 118. The body portion 208a extends on the central portion of the support substrate 202, but the outer periphery of the body portion 208a does not reach the outer periphery of the support substrate 202, that is, the outer periphery of the second substrate 200. In addition, the outer periphery of the body portion 208a is located closer to the center of the substrate than the circuit wirings 104, 106 and the peripheral circuit 108, and the body portion 208a is not opposed to these elements 104, 106, 108. Here, it exemplifies a case where the outer periphery of the body portion 208a is located closer to the center of the substrate than the outer periphery of the second substrate 200 all around, and is located closer to the center of the substrate than the circuit wirings 104, 106 and the peripheral circuit 108. The body portion 208a may be provided without patterning (without any gaps), or, as long as the body portion 208a achieves a shielding effect against static electricity, it may be patterned to form a mesh. In addition, the shape of the body portion 208a is not limited to the one exemplified in the drawing.

Here, FIG. 3 exemplifies a case where the outer periphery of the body portion 208a is flush with the outer periphery of the common electrode 116 and the outermost peripheries of the outermost pixel electrodes 118, while FIG. 2 exemplifies a case where the body portion 208a extends toward the outer periphery of the substrate than the outermost peripheries of the pixel electrodes 118. Note that, when the above dummy electrodes are provided, the body portion 208a may be provided so as to extend to be opposed to the electrodes 116, 118 for the dummy pixels, or may be provided inside the dummy pixels.

The pull-out portion 208b of the translucent conductive film 208 extends from the body portion 208a toward the outer periphery, having a terminal portion, of the liquid crystal panel 12 within the outer periphery of the support substrate 202. Note that the terminal portion of the liquid crystal panel 12 is provided in a portion of the first substrate 100, which does not overlap the second substrate 200, and the terminal portion is provided with a connection terminal, or the like, that is connected to the FPC 16. Here, FIG. 5 exemplifies a case where the pull-out portion 208b reaches the outer periphery of the support substrate 202, and FIG. 4 exemplifies a case where the pull-out portion 208b does not reach the outer periphery of the support substrate 202.

The translucent conductive film 208 is connected through the pull-out portion 208b to a predetermined electric potential, that is, for example, a ground electric potential. One example of this connection state will be described with reference to FIG. 4 and FIG. 5.

The first substrate 100 is configured to include, at the terminal portion, a wiring 140 for connection with the above predetermined electric potential, an insulating film 142, conductive portions 144, 146.

The wiring 140 has a first end portion that is provided around a boundary between the terminal portion and a portion at which the substrates 100, 200 overlap each other and a second end portion that is provided at the end portion of the terminal portion. The wiring 140 preferably avoids coupling by avoiding overlapping with another wiring. FIG. 4 exemplifies a case where the wiring 140 is located at the outermost side in the terminal portion. However, the wiring 140 may be provided at another position in the terminal portion. In addition, the plane pattern of the wiring 140 is not limited to the one exemplified in the drawing. FIG. 5 exemplifies a case where the wiring 140 is in contact with the support substrate 202. However, for example, the wiring 140 may be embedded in the insulating film 142 not to be in contact with the support substrate 202. When the wiring 140 is formed of the same material as those of the other wirings of the terminal portion, those of the circuit wirings 104, 106 (see FIG. 2), or the like, the wiring 140 may be formed at the same time with the above various wirings by patterning. According to the thus formed wiring 140 at the same time, it is possible to form the wiring 140 without increasing a process of manufacturing.

The insulating film 142 covers the wiring 140 and is arranged on the support substrate 202. The insulating film 142 may be, for example, formed by using any one of the insulating films 110, 112, 114 (see FIG. 3). The insulating film 142 has contact holes that are formed on one end portion of the wiring 140 and on the other end portion of the wiring 140, respectively.

The conductive portion 144 is connected through one of the above contact holes to the first end portion of the wiring 140 and extends onto the insulating film 142 around the contact hole. The conductive portion 146 is connected through the other contact hole to the second end portion of the wiring 140 and extends onto the insulating film 142 around the contact hole. Note that, in FIG. 4, the conductive portion 146 is omitted from the drawing. Here, the conductive portions 144, 146 correspond to so-called pad electrodes. The conductive portions 144, 146 are preferably arranged to avoid overlapping with the other wirings, or the like, other than the wiring 140 in order to avoid coupling. The conductive portions 144, 146 preferably cover the wiring 140 together with the insulating film 142 to avoid the wiring 140 being exposed to the outside, thus being protected from an external environment.

The conductive portions 144, 146 are, for example, formed of ITO, or the like. For example, by patterning the conductive portions 144, 146 at the same time with the pixel electrodes 118, it is possible to form the conductive portions 144, 146 without increasing a process of manufacturing. The liquid crystal panel 12 is configured to further include a connection body 306 that is externally connected to the substrates 100, 200. Here, the connection body 306 is arranged on the pull-out portion 208b of the translucent conductive film 208, and extends along the side face of the second substrate 200 to the first substrate 100 to be arranged on the conductive portion 144. Thus, the translucent conductive film 208 is connected through the connection body 306 and the conductive portion 144 to the wiring 140. In this case, by elongating the pull-out portion 208b of the translucent conductive film 208 toward the wiring 140, it is possible to reduce the length of the connection body 306. The connection body 306 preferably covers the entire conductive portion 144 and avoids the conductive portion 144 being exposed to the outside, thus making it possible to protect the conductive portion 144 from an external environment (see FIG. 4 and FIG. 5). In addition, the connection body 306 is preferably arranged to avoid overlapping with the other wirings, or the like, other than the wiring 140 in order to avoid coupling.

The connection body 306 may be, for example, formed by applying and hardening conductive paste, such as silver paste or carbon paste, for example. When the conductive paste is used, it is possible to easily form the connection body 306 by applying and hardening the conductive paste. The connection body 306 preferably has a lowest possible resistivity as compared with the translucent conductive film 208. In addition, the connection body 306 is preferably thinner than the other elements, that is, for example, a polarizer, and the like (not shown), provided on the outer surface of the support substrate 202. In this way, the connection body 306 never prevents the liquid crystal display device 10 from being thinned.

The liquid crystal display device 10 is configured to include an ACF (Anisotropic Conductive Film) 22 between the FPC 16 and the conductive portion 146, and a wiring 16a of the FPC 16 and the wiring 140 are electrically connected by the ACF 22. The ACF 22 may be provided only for the wirings 16a, 140, and may also be used to connect another wiring of the terminal portion with the FPC 16. In the liquid crystal display device 10, the wiring 16a of the FPC 16 is connected to the predetermined electric potential, and, thereby, the translucent conductive film 208 is connected through the wiring 16*a*, the ACF 22, the conductive portion 146, the wiring 140, the conductive portion 144 and the connection body 306 to the predetermined electric potential. FIG. 1 exemplifies a case where the predetermined electric potential is a ground electric potential in the external circuit 18. In order to protect from an external environment, the ACF 22 preferably covers both the conductive portion 146 and the wiring 16*a* to avoid exposing the conductive portion 146 and the wiring 16*a* to the outside.

According to the above configuration, the body portion 208*a* of the translucent conductive film 208 is provided on the inner side than the outer periphery of the support substrate 202. Therefore, in comparison with the existing liquid crystal display device 10Z in which the translucent conductive film 208Z extends over the entire surface of the support substrate 202Z, the length of a path from the outer peripheral portion of the translucent conductive film 208 over the side face of the support substrate 202 to the circuit wiring 104 of the first substrate 100, or the like, is increased. Thus, even when static electricity enters the translucent conductive film 208, it is possible to suppress the entry of static electricity through the above path. Hence, it is possible to improve electrostatic discharge resistance.

In addition, because the body portion 208*a* of the translucent conductive film 208 is not opposed to the circuit wirings 104, 106, or the like, of the first substrate 100, it is possible to avoid coupling between the translucent conductive film 208 and the circuit wirings 104, 106, or the like. For this reason, even when static electricity enters the translucent conductive film 208, it is possible to suppress static electricity from being transmitted from the translucent conductive film 208 to the circuit wirings 104, 106, or the like, due to coupling. Thus, it is possible to improve electrostatic discharge resistance.

Furthermore, in light of the evaluation that static electricity tends to be transmitted to a circuit wiring that extends along the outer periphery of the substrate, electrostatic discharge resistance is reliably improved by the translucent conductive film 208.

Here, the above description exemplifies a case where the translucent conductive film 208 is in contact with the outer surface of the support substrate 202. However, for example, an insulating film may be provided between the translucent conductive film 208 and the support substrate 202. An example of the insulating film includes an optical film, such as a polarizer, a retardation film, an optical compensation film, a luminance enhancement film, and an antireflective film.

Moreover, the above description exemplifies the FFS mode in which the electrodes 116, 118 that drive the liquid crystal 302 are laminated through the insulating film 112. However, it may be configured as an IPS mode in which both electrodes 116, 118 are arranged in the same layer (for example, on the insulating film 112). When in the IPS mode, for example, the electrodes 116, 118 having a comb-shaped pattern are arranged so that the comb-shaped portions are alternately meshed with each other.

Figure 6:
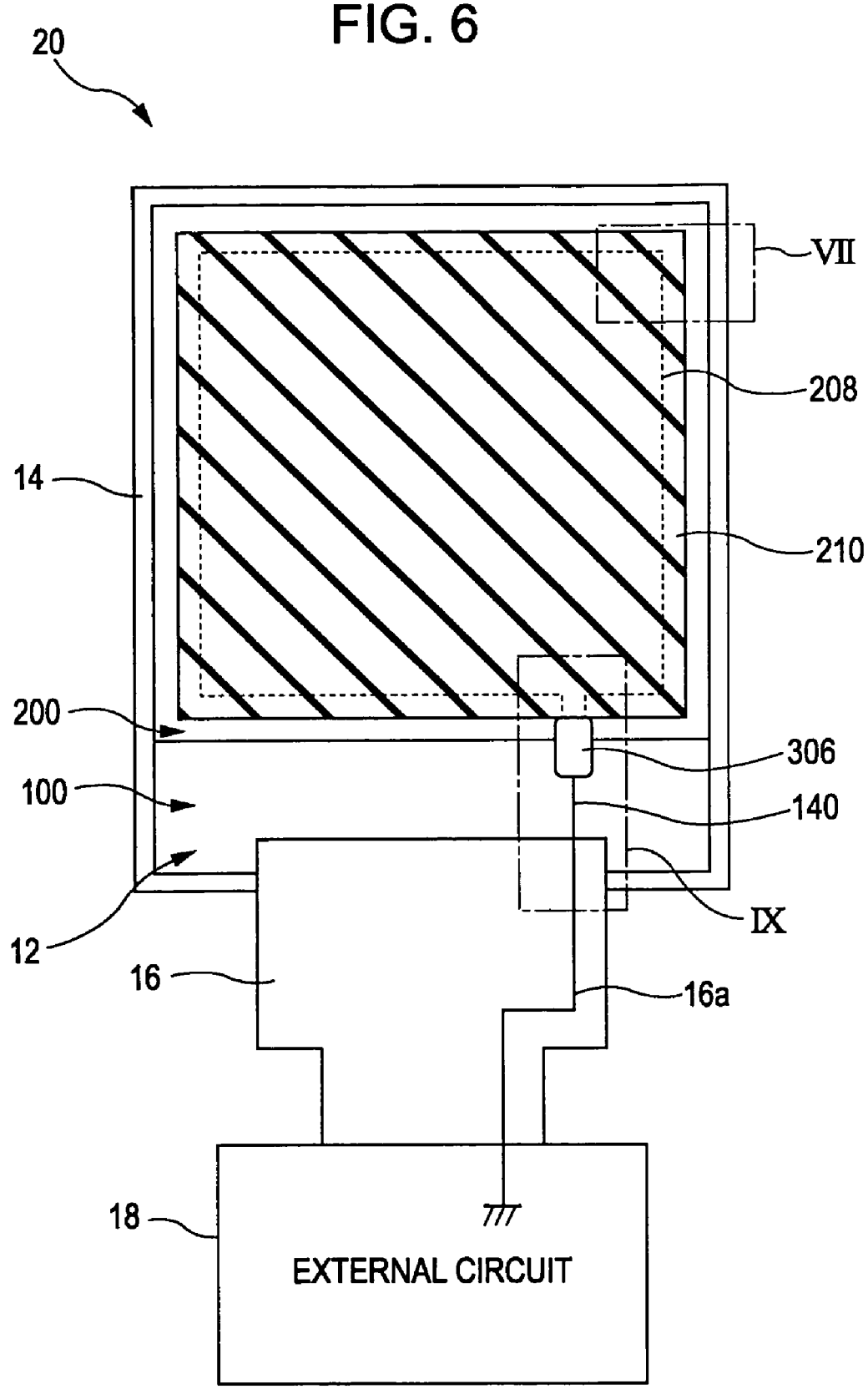
FIG. 6 is a schematic view of liquid crystal display device according to an embodiment of the invention.

A second embodiment according to the invention will now be described. FIG. 6 is a schematic view of a liquid crystal display device 20 according to the second embodiment. The liquid crystal display device 20 according to the second embodiment is configured to include an insulating film 210 within the second substrate 200 of the liquid crystal display device 10 according to the first embodiment. FIG. 6 to FIG. 10, which are explanatory views of the liquid crystal display device 20 according to the second embodiment, are views corresponding to FIG. 1 to FIG. 5, which are explanatory views of the liquid crystal display device 10 according to the first embodiment. In FIG. 6 to FIG. 10, the same reference numerals are assigned to the same components to those of the first embodiment.

The second substrate 200 of the liquid crystal display device 20 includes the support substrate 202 that is, for example, formed of a translucent substrate, such as glass, and is configured to include, on the inner surface side of the support substrate 202, that is, on the side adjacent to the liquid crystal 302, the light shielding film 204 and the color filter 206 and to include, on the outer surface side of the support substrate 202, that is, on the side opposite to the liquid crystal 302, the translucent conductive film 208 and the insulating film 210. Note that FIG. 7 is a view that shows the translucent conductive film 208 by alternate short and long dash line, and the insulating film 210 is shown by alternate short and long dash line.

The body portion 208*a* of the translucent conductive film 208 is opposed to the common electrode 116 and the pixel electrodes 118. The body portion 208*a* extends on the central portion of the support substrate 202, but the outer periphery of the body portion 208*a* does not reach the outer periphery of the support substrate 202, that is, the outer periphery of the second substrate 200. Here, it exemplifies a case where the outer periphery of the body portion 208*a* is located closer to the center of the substrate than the circuit wirings 104, 106 and the peripheral circuit 108, and the body portion 208*a* is not opposed to these elements 104, 106, 108. In addition, it exemplifies a case where the outer periphery of the body portion 208*a* is located closer to the center of the substrate than the outer periphery of the second substrate 200 all around, and is located closer to the center of the substrate than the circuit wirings 104, 106 and the peripheral circuit 108. The body portion 208*a* may be provided without patterning (without any gaps), or, as long as the body portion 208*a* achieves a shielding effect against static electricity, it may be patterned to form a mesh. In addition, the shape of the body portion 208*a* is not limited to the one exemplified in the drawing.

Figure 7:
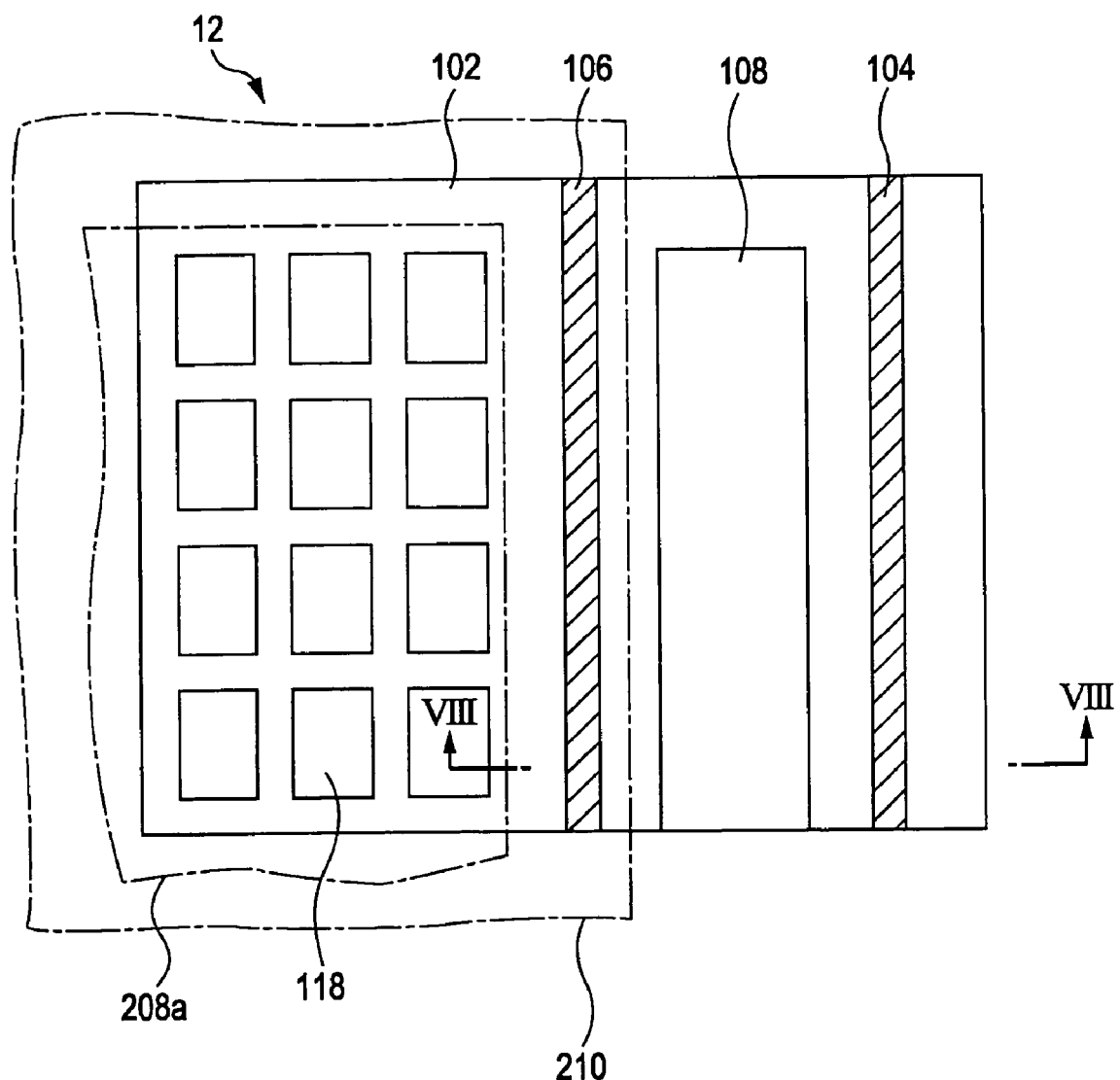
FIG. 7 is a plan view of a portion VII, which is surrounded by alternate short and long dash line in FIG. 6.
Figure 8:
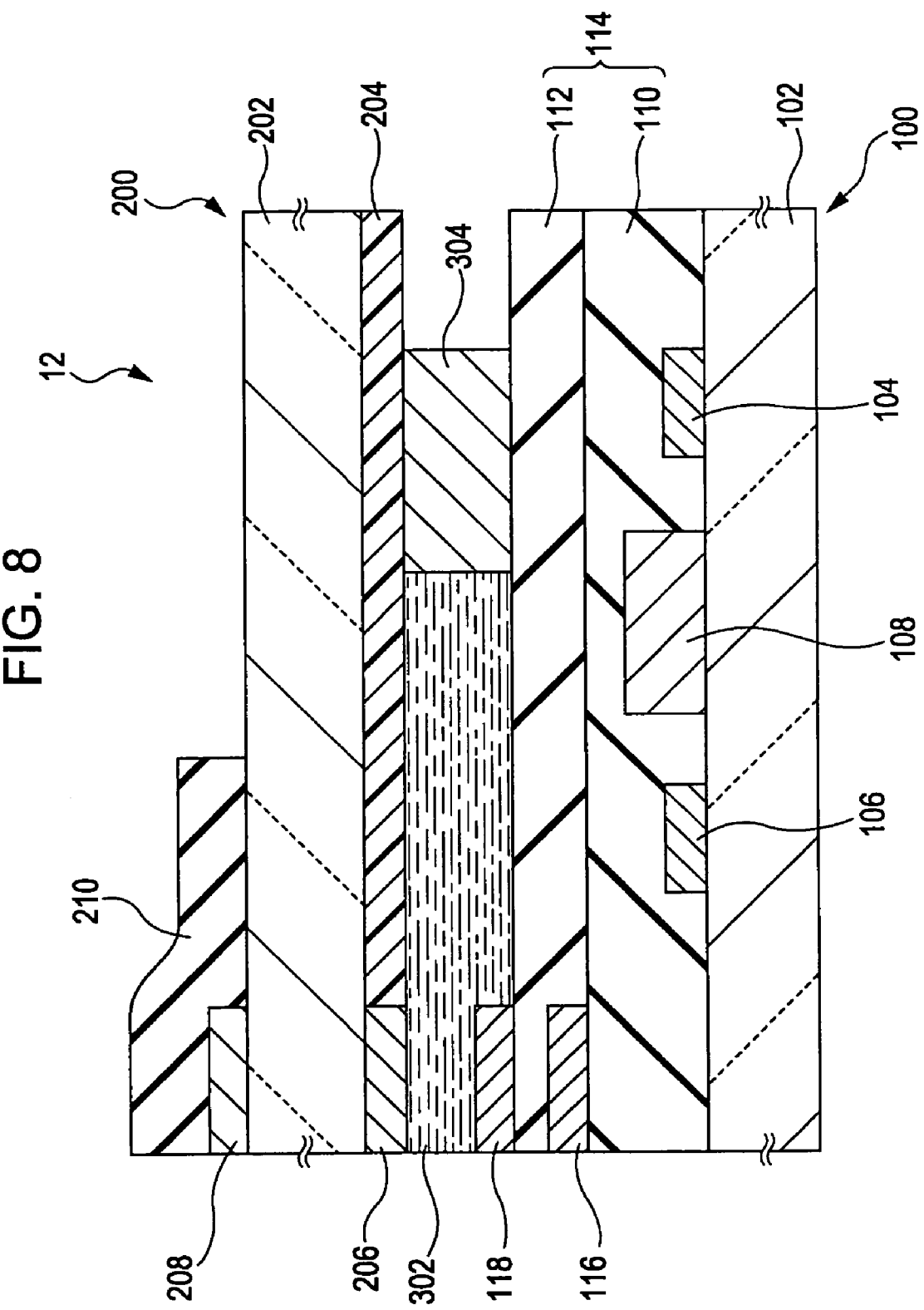
FIG. 8 is a cross-sectional view that is taken along the line VIII-VIII in FIG. 7.

Here, FIG. 6 exemplifies a case where the outer periphery of the body portion 208*a* is flush with the outer periphery of the common electrode 116 and the outermost peripheries of the outermost pixel electrodes 118, while FIG. 7 exemplifies a case where the body portion 208*a* extends toward the outer periphery of the substrate beyond the outermost peripheries of the pixel electrodes 118. Note that, when the above dummy electrodes are provided, the body portion 208*a* may be provided so as to extend to be opposed to the electrodes 116, 118 for the dummy pixels, or may be provided inside the dummy pixels.

The pull-out portion 208*b* of the translucent conductive film 208 extends from the body portion 208*a* toward the outer periphery of the liquid crystal panel 12, which provides a terminal portion, within the outer periphery of the support substrate 202. Note that the terminal portion of the liquid crystal panel 12 is provided in a portion of the first substrate 100, which does not overlap the second substrate 200, and the terminal portion is provided with a connection terminal, or the like, that is connected to the FPC 16. Here, FIG. 10 exemplifies a case where the pull-out portion 208*b* reaches the outer periphery of the support substrate 202, and FIG. 9 exemplifies a case where the pull-out portion 208*b* does not reach the outer periphery of the support substrate 202.

The insulating film 210 is arranged on the translucent conductive film 208 and is opposed to the support substrate 202 and the liquid crystal 302 through the translucent conductive film 208. In addition, the outer periphery of the insulating film 210 is located on the side adjacent to the outer periphery of the substrate than the outer periphery of the body portion 208*a* of the translucent conductive film 208, and a portion that extends over the body portion 208*a* is arranged on the outer surface of the support substrate 202. Therefore, the insulating film 210 and the support substrate 202 avoid the outer peripheral portion of the translucent conductive film 208 from being exposed to the outside (that is, outside air) (see FIG. 6). In the drawing, it exemplifies a case where exposure of the body portion 208a of the translucent conductive film 208 is avoided all around the outer peripheral portion. The insulating film 210 may be, for example, formed of an optical film, such as a polarizer, a retardation film, an optical compensation film, a luminance enhancement film, and an antireflective film.

Figure 9:
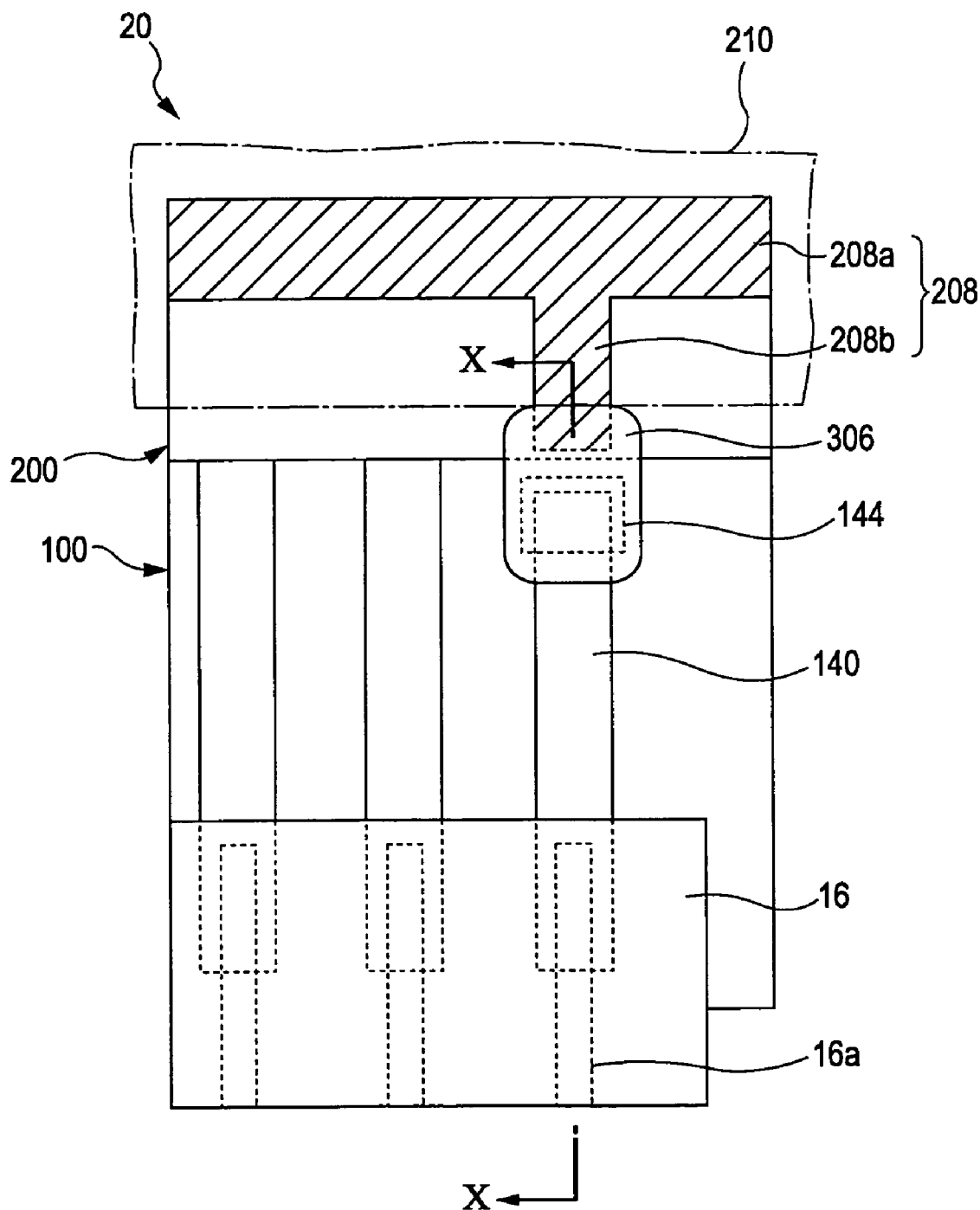
FIG. 9 is a plan view of a portion IX, which is surrounded by alternate short and long dash line in FIG. 6.
Figure 10:
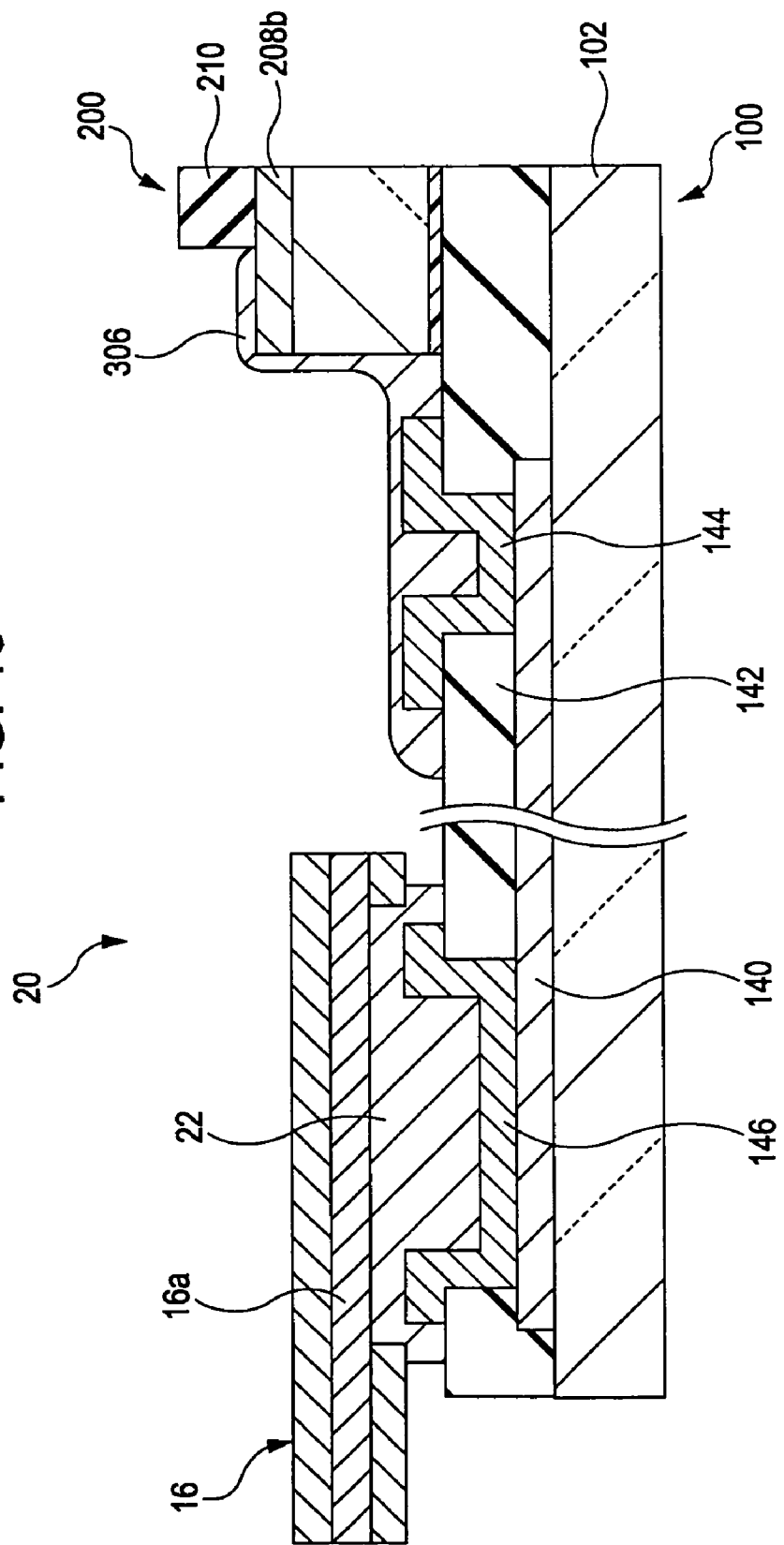
FIG. 10 is a cross-sectional view that is taken along the line X-X in FIG. 9.

As in the case of the liquid crystal display device 10 according to the first embodiment, the translucent conductive film 208 is connected through the pull-out portion 208b to a predetermined electric potential, that is, for example, a ground electric potential. One example of this connection state is shown in FIG. 9 and FIG. 10.

According to the above configuration, the body portion 208a of the translucent conductive film 208 is covered with the insulating film 210 and its outer peripheral portion is avoided from being exposed. Thus, even when static electricity enters the translucent conductive film 208, it is possible to suppress transmission of static electricity through a path from the outer peripheral portion of the translucent conductive film 208 over the side face of the support substrate 202 to the circuit wiring 104 of the first substrate 100, or the like. Furthermore, it is possible to suppress the entry of static electricity from the outer peripheral portion. Hence, it is possible to improve electrostatic discharge resistance. In this case, the distance between the outer periphery of the translucent conductive film 208 and the outer periphery of the insulating film 210 is preferably equal to or greater than the thickness of the insulating film 210.

In addition, by providing the body portion 208a of the translucent conductive film 208 being not opposed to the circuit wirings 104, 106, or the like, of the first substrate 100, it is possible to avoid coupling between the translucent conductive film 208 and the circuit wirings 104, 106, or the like. For this reason, it is possible to suppress static electricity from being transmitted from the translucent conductive film 208 to the circuit wirings 104, 106, or the like, due to coupling. Hence, it is possible to improve electrostatic discharge resistance.

Furthermore, in light of the evaluation that static electricity tends to be transmitted to a circuit wiring that extends along the outer periphery of the substrate, electrostatic discharge resistance is reliably improved by the translucent conductive film 208 and the insulating film 210.

Here, the above description exemplifies a case where the translucent conductive film 208 is in contact with the outer surface of the support substrate 202. However, for example, an insulating film may be provided between the translucent conductive film 208 and the support substrate 202. An example of the insulating film includes an optical film, such as a polarizer, a retardation film, an optical compensation film, a luminance enhancement film, and an antireflective film. In addition, the above description exemplifies a case where the insulating film 210 is in contact with the translucent conductive film 208. However, another film, or the like, may be provided between the insulating film 210 and the translucent conductive film 208.

What is claimed is:

1. A liquid crystal display device comprising:
a first substrate that includes pixel electrodes, at least one common electrode, and a circuit wiring;
a second substrate that is opposed to the first substrate and that includes a translucent conductive film; and
liquid crystal that is held between the first substrate and the second substrate, wherein
the circuit wiring is arranged outside a pixel area in which a plurality of pixels, which are formed of the pixel electrodes and the at least one common electrode, are arranged, wherein
the translucent conductive film is arranged on an opposite side of the second substrate to a side where the liquid crystal is present, and the translucent conductive film is opposed to the pixel electrodes and the at least one common electrode, wherein the translucent conductive film is maintained at a predetermined electric potential, and wherein
the translucent conductive film has an outer periphery that is located closer to a center of the second substrate than an outer periphery of the second substrate.

2. The liquid crystal display device according to claim 1, wherein the outer periphery of the translucent conductive film is located closer to the center of the second substrate than the circuit wiring.

3. The liquid crystal display device according to claim 1, wherein the circuit wiring extends along an outer periphery of the first substrate.

4. The liquid crystal display device according to claim 1, wherein the first substrate further includes a predetermined electric potential applying wiring to which the predetermined electric potential is applied, wherein
the translucent conductive film has a pull-out portion that extends toward the predetermined electric potential applying wiring, and wherein the translucent conductive film is connected through the pull-out portion to the predetermined electric potential applying wiring.

5. A liquid crystal display device comprising:
a first substrate that includes pixel electrodes, at least one common electrode, and a circuit wiring;
a second substrate that is opposed to the first substrate and that includes a translucent conductive film and an insulating film; and
liquid crystal that is held between the first substrate and the second substrate, wherein
the circuit wiring is arranged outside a pixel area in which a plurality of pixels, which are formed of the pixel electrodes and the at least one common electrode, are arranged, wherein
the translucent conductive film is arranged on an opposite side of the second substrate to a side where the liquid crystal is present, and the translucent conductive film is opposed to the pixel electrodes and the at least one common electrode, wherein the translucent conductive film is maintained at a predetermined electric potential, and wherein
the insulating film is arranged on the translucent conductive film, and the insulating film covers an outer periphery of the translucent conductive film.

6. The liquid crystal display device according to claim 5, wherein the outer periphery of the translucent conductive film is located closer to a center of the second substrate than the circuit wiring.

7. The liquid crystal display device according to claim 5, wherein the circuit wiring extends along an outer periphery of the first substrate.

8. The liquid crystal display device according to claim 5, wherein the insulating film is an optical film.

* * * * *